July 22, 1969  E. A. MEYER  3,456,550
DRIVE CLIPS
Filed April 15, 1968
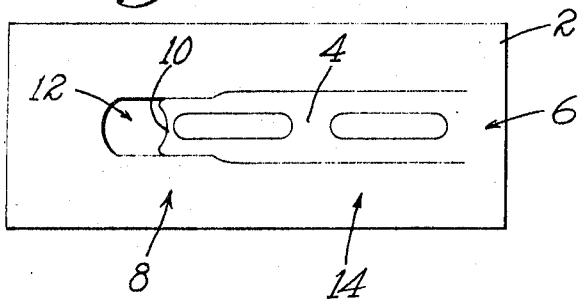
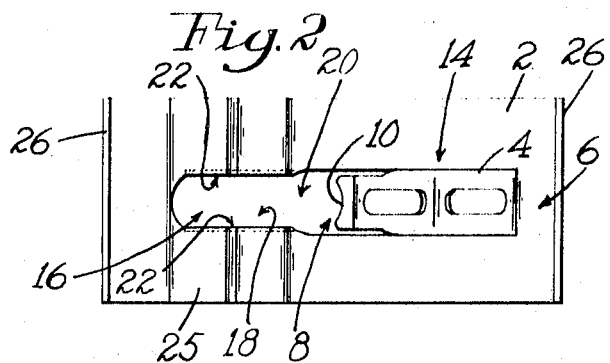
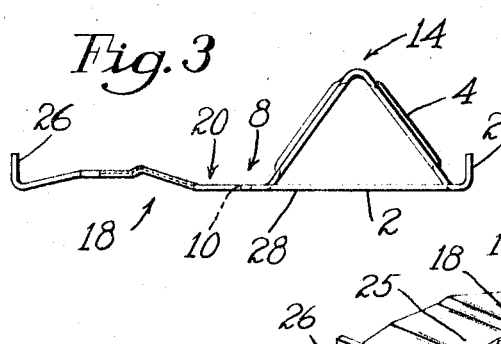
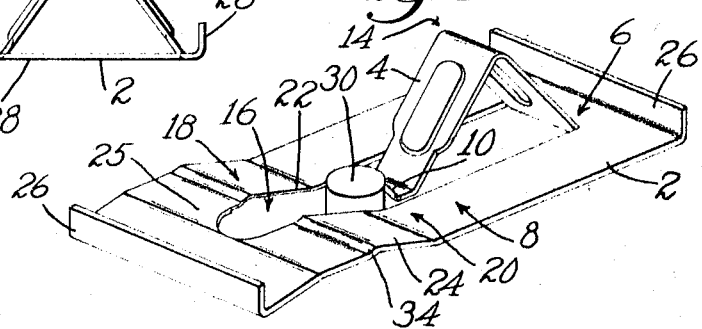
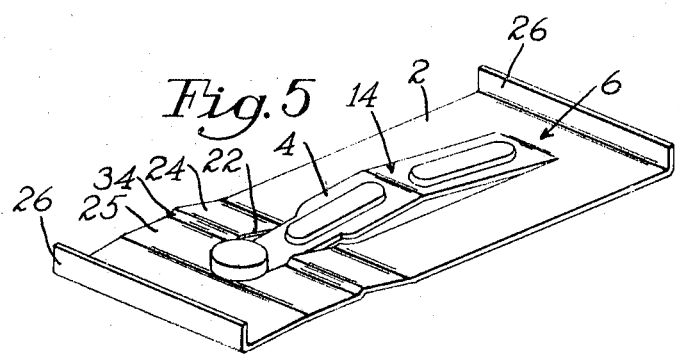
Inventor
Engelbert A. Meyer
By his Attorney

United States Patent Office 3,456,550
Patented July 22, 1969

3,456,550
DRIVE CLIPS
Engelbert A. Meyer, Union Lake, Mich., assignor to Warren Fastener Corporation, Mt. Clemens, Mich., a corporation of Michigan
Filed Apr. 15, 1968, Ser. No. 721,247
Int. Cl. F16b 37/02; E04g 17/04
U.S. Cl. 85—36                                           3 Claims

ABSTRACT OF THE DISCLOSURE

A clip for securing to a stud, the clip comprising a body portion having stud receiving means and having cutting means for engagement with the stud, the clip further comprising means integral with the clip for forcing the cutting means into engagement with the stud responsive to application of force on the clip from a direction generally normal to the plane of the body portion.

Background of the invention

*Field of the invention.*—This invention relates to a clip for securing to a stud and is directed more particularly to a clip which may be secured to a stud without the use of sophisticated tools.

*Description of the prior art.*—In the attachment of various structural members to supports, as for example trim and the like to automobiles, electrical appliances, and the like, it is known to attach a stud to a support, as by welding, to secure a clip to the stud, and then mount the trim on the clip whereby to fasten the trim onto the support. In order to facilitate securing a clip to the stud, the stud is generally provided with an enlarged head which is received by the clip. In addition, the clip is generally provided with a biasing means which serves to cam the clip against the head of the stud in such a way that the clip will not readily disengage from the stud. As may be appreciated, such arrangements require the provision of studs having heads accurately spaced from the plane of the support. In addition, the requirement of a headed stud necessitates undesirable expense, not only in the manufacture of the studs, but also in their handling prior to attachment to the support.

More recently, there have been devised clips which may be used with headless and threadless studs. For example, application for United States Letters Patent Ser. No. 681,446, filed Nov. 7, 1967, in my name, is directed toward a clip having cutting edges which engage a stud whereby to facilitate retention of the clip on the stud. While such clip has solved many of the problems of the prior art, the clip must be moved laterally in order for its cutting edges to engage a stud. Accordingly, tools for imparting the lateral movement have been utilized to set the clip. It has been found advantageous, however, to provide such a clip with facility for engaging a stud responsive to a force applied from a direction generally normal to the plane of the clip as opposed to a required application of force from a direction generally parallel to the plane of the clip.

Summary of the invention

It is an object of the present invention to provide a clip for securing to a headless stud.

It is a further object of the invention to provide such a clip which is secured to a stud by application of force upon the clip from a direction generally normal to the plane of the clip.

With the above and other objects in view, as will hereinafter appear, a feature of the present invention is the provision in a clip, of the type above referred to, of cutting means for engagement with a stud, and drive means integral with the clip for urging the cutting means of the clip into cutting engagement with the stud, responsive to application of force upon the clip from a direction generally normal to the plane of the clip, as by a common hammer.

The above and other features of the invention, including various novel details of construction, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

Brief description of the drawings

FIG. 1 is a plan view of one form of clip illustrative of an embodiment of the invention, showing the clip at a period during its manufacture, but prior to completion;

FIG. 2 is a plan view similar to FIG. 1, but showing the clip in its completed form;

FIG. 3 is an elevational view of the device shown in FIG. 2;

FIG. 4 is a perspective view of the device shown in FIGS. 2 and 3, but shown in combination with a stud to which it is to be secured; and FIG. 5 is similar to FIG. 4, but shows the clip and stud after the clip-setting operation.

Description of the preferred embodiment

Referring to FIG. 1, it may be seen that the illustrative device comprises a body portion 2 having a central arm member 4 cut therefrom, but integrally connected to the body portion 2 at one end 6. The other end 8 of the arm 4 is cut back somewhat toward the connected end 6 and provided with an arcuate edge 10 for engagement with a stud, as will be explained below. Between the edge 10 of the free end 8 of the arm 4 and the proximate portion of the planar member 2 is defined an opening 12.

Referring to FIGS. 2 and 3, it will be seen that in accordance with the present invention the arm 4 is bowed outwardly from the body portion 2 at substantially the mid-point 14 of the arm. The free end 8 of the arm is bent in such a manner as to remain generally in the plane of the body portion 2. Bowing of the arm 4 enlarges the opening 12 (FIG. 1) to define a slot 16 having a stud cutting area 18 and a stud receiving area 20.

The stud cutting area 18 of the slot 16 is provided with opposed beveled edges 22. The body portion 2 proximate to the stud cutting area 18 of the slot 16 is bowed outwardly from the plane of the member 2 and in the same general direction as the arm 4 to define an inclined ramp portion 24 and a stud seat 25. The inclined ramp portion 24 operates to bias the clip toward the support on which the stud is fixed, and to lock the clip upon the stud, as will be explained further below.

The ends 26 of the planar member 2 may be turned upwardly, as shown in FIGS. 2–5, to facilitate the mounting of the trim member thereon, and also to afford structural rigidity to the clip, as well as to prevent scraping of the support by a raw edge.

In operation, the device is placed upon a stud member 30, as shown in FIG. 4, the stud member being secured to a support and being received in the area 20 of the slot 16. In this position the stud 30 is adjacent the arcuate edge 10 of the free end 8 of the arm 4 and also adjacent the cutting area 18 of the slot 16. The underside 28 of the member 2 is adjacent the surface of the support (not shown) to which the stud 30 is affixed or, alternatively, is adjacent a member (not shown) which is to be clamped to the support to which the stud is fixed.

In order to securely affix the clip to the stud, the device is dealt a blow in the area of the bend of the arm, as for example at 14, as shown in FIGS. 2-4. The blow is from a general direction normal to the plane of the body portion 2. An ordinary hammer is a suitable instrument for providing the necessary force upon the bend 14 of the arm. Striking the arm 4 is accomplished in much the same manner as striking a nail head. Thus, while the blow, or force, is described as coming from a direction normal to the plane of the body portion, it will be appreciated that such direction need be normal to the body portion in only a general sense, much as in driving a nail, where blows somewhat off the desired angle nevertheless perform the operation at hand. The force of the blow on the arm 4 causes the arm to be urged against the stud 30 and to tend to resume its position in the slot 16 within the plane of the member 2. The tendency of the arm to resume its position within the slot (the position shown in FIG. 1) causes the clip to move in a direction toward the connected end 6 of the arm. Such movement of the clip relative to the stud 30 causes the cutting area 18 of the slot to move about the stud thereby causing engagement between the stud and the cutting edges 22. The cutting edges 22 cut into the softer material of the stud as the clip is forced to move relative to the stud. The ramp portion 24 tensions the clip in a direction toward the support to which the stud 30 is attached. As the clip is further forced toward the stud the ramp portion 24 of the clip leaves the stud 30 which is then engaged by the seat portion 25 of the clip, as shown in FIG. 5. A fold 34, disposed between the ramp portion 24 and seat portion 25, operates to prevent reverse movement of the clip relative to the stud.

The specific structure of the cutting edges 22, along with suggested suitable materials, and a more detailed discussion of the operation of the ramp, fold and seat portions of the clip are to be found in the above-mentioned patent application which is by reference incorporated herein.

It is to be understood that the present invention is by no means limited to the particular construction herein disclosed and/or shown in the drawings, but also comprises any modifications or equivalents.

Having thus described my invention, what I claim is new and desire to secure by Letters Patent of the United States is:

1. A unitary clip formed of sheet material comprising a generally planar body portion, an arm member cut from said body portion to form an elongated slot therein, a first end of said arm member being integral with said body portion and a second end thereof being free, said arm member being bowed outwardly from the plane of said body portion in overlying relationship with at least a part of said slot, a first end of said slot being common with said first end of said arm, a cutting edge defining at least a portion of at least one side of said slot, and adjacent a second end of said slot, said second end of said slot being opposed by the second end of said arm, said slot being adapted to receive a stud, and said second end of said arm member being engageable with said stud responsive to application of force on said arm member from a direction generally normal to the plane of said body portion to move said body portion relative to said stud and generally in the plane of said body portion whereby to cause said cutting edge to cuttingly engage said stud.

2. A unitary clip formed of sheet material for driving onto a stud, said clip comprising a generally planar body portion, an arm portion cut from said body portion to form an elongated slot therein, said arm portion being bowed outwardly from said body portion in overlying relationship with at least a part of said slot, a first end of said arm portion being integral with said body portion and a second end thereof being free, a first end of said slot being common with said first end of said arm portion, said second end of said arm portion being disposed substantially in said slot, said body portion having a stud receiving portion and a stud seating portion, said stud seating portion including a second end of said slot, a cutting edge defining at least in part a side of said slot adjacent the second end thereof and disposed substantially between said stud receiving portion and said stud seating portion, said second end of said slot being opposed by said second end of said arm, said arm portion being adapted to receive force applied from an outside source and to cause said second end thereof to engage said stud thereby causing said body portion to move relative to said stud, whereby said cutting edge cuttingly engages said stud to define groove means on said stud engageable by said stud seating portion.

3. The invention according to claim 9 including a second cutting edge defining at least in part a second side of said slot and opposing said first cutting edge.

References Cited

UNITED STATES PATENTS

| | | | |
|---|---|---|---|
| 2,203,397 | 6/1940 | Taylor | 85—36 |
| 2,367,109 | 1/1945 | Fay | 85—36 |
| 2,415,540 | 2/1947 | Simmons | 85—36 |
| 2,574,107 | 11/1951 | Joy | 85—36 |
| 2,746,340 | 5/1956 | Sislik | 85—36 |
| 2,798,406 | 7/1957 | Steck | 85—36 |

FOREIGN PATENTS 1,099,968  3/1955  France.

CARL W. TOMLIN, Primary Examiner

R. S. BRITTS, Assistant Examiner

U.S. Cl. X.R.

249—219